July 28, 1970          G. MAYER          3,521,724

MOTOR VEHICLE STEERING COLUMN MOUNTING CONSTRUCTION

Filed April 4, 1968          2 Sheets-Sheet 1

INVENTOR.
GUSTAV MAYER

BY

*McGlew & Toren*
ATTORNEYS

INVENTOR.
GUSTAV MAYER

United States Patent Office 3,521,724
Patented July 28, 1970

3,521,724
MOTOR VEHICLE STEERING COLUMN
MOUNTING CONSTRUCTION
Gustav Mayer, Wolfsburg, Germany, assignor to Volkswagenwerk Aktiengesellschaft, Wolfsburg, Germany
Filed Apr. 4, 1968, Ser. No. 718,747
Claims priority, application Germany, Apr. 4, 1967, 1,655,597
Int. Cl. B62d 1/18
U.S. Cl. 180—91                       16 Claims

ABSTRACT OF THE DISCLOSURE

An automobile steering column mounting construction includes a bracing strut which supports the steering column at a location below the instrument panel and which is subdivided into sections by predetermined break lines. Associated with the bracing strut is a lever and associated mechanism for insuring and/or aiding the collapse of the bracing strut and its retention in a collapsed condition so that the steering column can move away from the driver in the event of a collision of the vehicle and will not thereafter move back against him. In one embodiment the collapse of the bracing strut is initiated by the backward movement of a rod member connected to the bumper to cause a connecting cable to bring about the buckling of the bracing strut in a weakened area. In another embodiment, an inertia member or weight is mounted in a position so that its forward movement which would be caused by a sudden collision will cause the breaking of the bracing strut. In both embodiments the collapsed bracing strut is held in a collapsed position by a ratchet and pawl mechanism.

SUMMARY OF THE INVENTION

This invention relates in general to vehicle construction and in particular to a new and useful construction for mounting the steering column of a motor vehicle so that it will move forward upon sudden impact such as would occur in a collision.

Many different types of steering column mountings for safety operation are known for the so-called hood steering type of vehicle which has a driving engine or a trunk space over the front axle. With such designs safety is insured by the compression of the steering column which is installed with a relatively slight inclination so that the column moves out of the way of the driver and lessens the danger of material injury to the driver by impact against the steering wheel. The disadvantage of such constructions is that the horizontal movement path of the steering wheel pushing in the direction of its axis is very small because of the steep arrangement of the steering column.

The present invention is applicable to a construction in which the steering column is pivotally mounted and is connected with its associated steering gear by means of a joint which is angularly movable to all sides. Such a design is used in front steering vehicles where the steering column pivots together with the front door in order to facilitate getting in and out of the vehicle. With the use of the pivotal steering column the invention achieves a solid anchoring of the column which is set steeply within the front driver's compartment by the use of a bracing strut which extends from the front wall of the vehicle below the instrument panel into engagement with the steering column at the location of the ignition lock casing. The bracing strut is oriented to point in the direction of travel and it is divided into sections by predetermined weakening areas or break points. The central or intermediate portion of the strut carries a vertical lever which is intended as part of a collapsing mechanism for initiating the buckling of the strut in collision accidents. The inventive construction is very simple and results in savings of manufacturing expense and it provides a simple means for insuring that the displacement path of the steering wheel can be determined by the dimensioning of the length of the individual bracing strut sections. The inventive concepts can be adapted to the various types of front steering vehicles with little difficulty and expense. Safe operation is insured by providing the predetermined break points which are fashioned so that they withstand the normal operating stresses that buckle at higher forces in the direction of travel (for example, deceleration forces) in collision accidents. The steering wheel and the steering column, due to the force of inertia, move away from the driver by pivoting about the lower pivotal mounting point.

A feature of the invention is that the buckling of the bracing strut is carried out with mechanism that insures that it will not bounce back after impact. For this purpose, on one of the strut sections there is formed a blocking tooth or pawl which engages with a ratchet arranged in the other section.

Advantageously the device which becomes active in collision accidents, consists of a slide bolt which is guided in a fixed clamp and projects forward to a spaced location behind the front bumper. A cable is fastened to the other end of the slide bolt and it is guided over a lever member into engagement with a portion of the bracing strut. The movement of the slide bolt during a collision causes the cable to carry out the buckling of the bracing strut and permits the forward movement of the steering column. In an alternate arrangement, the mechanism includes a weight member which is arranged on the free end of the lever at a location at which it would move forward during a collision and to facilitate the buckling of the bracing strut.

The invention also includes a ratchet and pawl arrangement between the buckling parts of the bracing strut which interengage and prevent return movement of the two parts after their initial collapse. The ratchet may be a straight ratchet member or the circular or arcuate ratchet member contoured in the path of movement of the collapse of the various parts of the bracing strut.

Accordingly it is an object of the invention to provide a safety mounting for a steering column which is pivotally mounted in the forward driving compartment of an automobile and wherein a bracing strut which supports the upper end of the column is formed of sections which may collapse to facilitate the forward movement of the steering column during a collision.

A further object of the invention is to provide a device with collapsible sections which secures the steering column in an operable position but which permits the forward movement of a steering column out of the way of an operator during an impact caused by collision and which also includes means for holding the parts which collapse upon the forward movement of the steering column in a collapsed condition after such collapsing occurs.

A further object of the invention is to provide a bracing strut arrangement for a steering column which includes a member divided into individual sections by weakened areas or break lines with means connected to the member for facilitating the collapse of the member and for retaining the member in a collapsed condition after the initial collapsing movement occurs.

A further object of the invention is to provide a steering mechanism having a safety collapsible arrangement which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
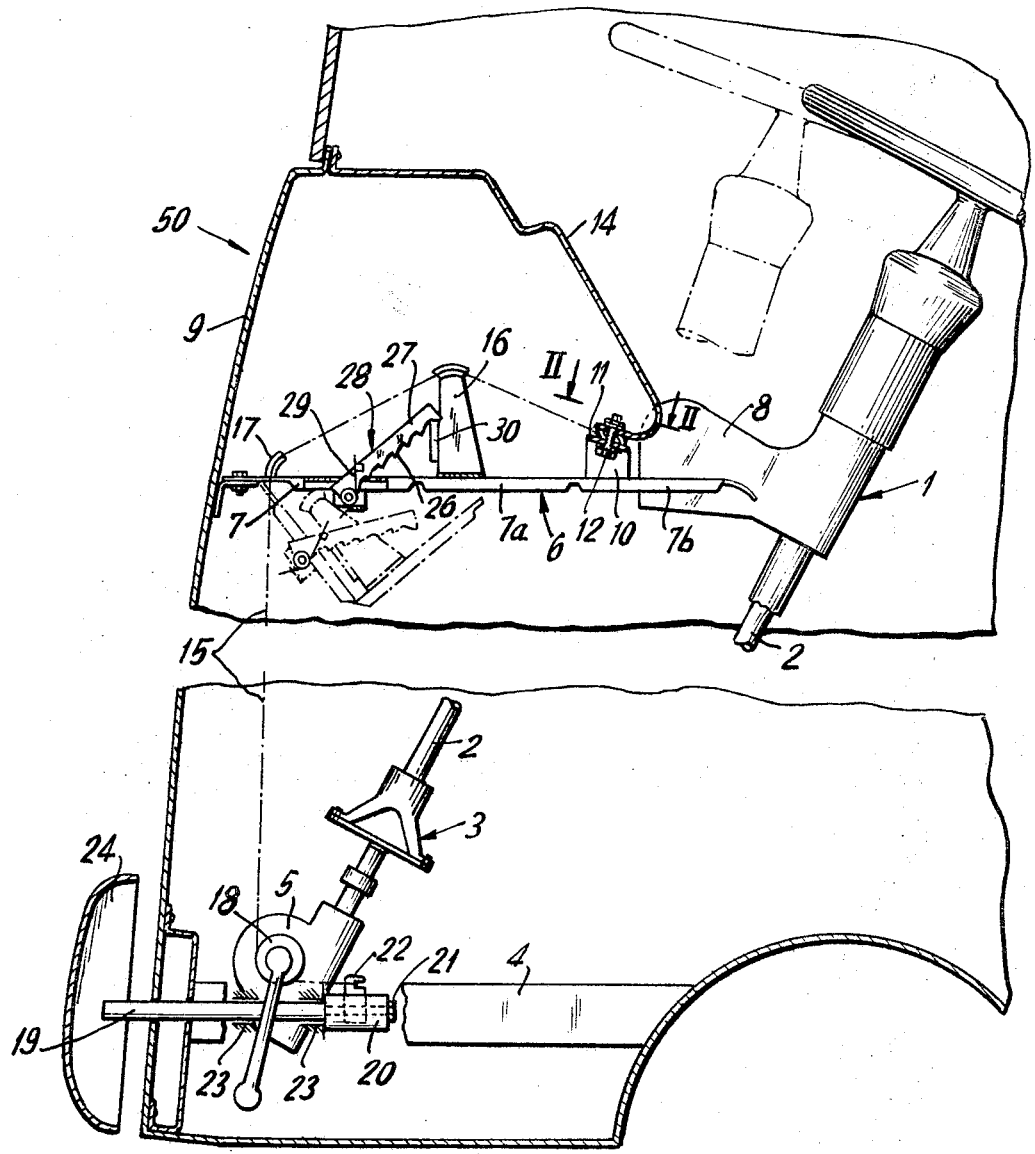
FIG. 1 is a schematic broken away partial longitudinal sectional and partial side elevational view of a vehicle steering engine mounting construction constructed in accordance with the invention.
Figure 2:
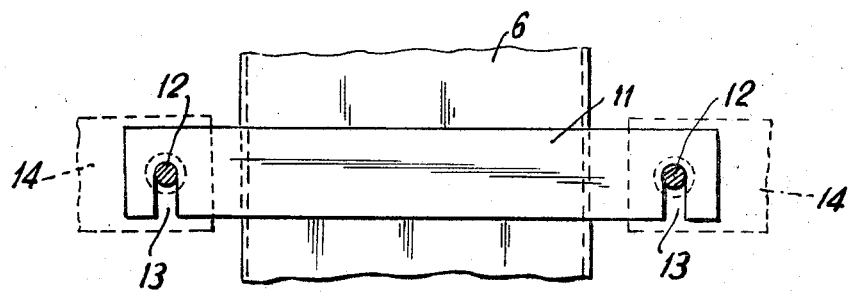
FIG. 2 is a partial section taken along the line II—II of FIG. 1.

Referring to the drawings in particular, the invention embodied therein in FIGS. 1 and 2 comprises a steep-set steering column generally designated 1 of a front steering vehicle generally designated 50. The steering column 1 is pivotally mounted in the vehicle 50 adjacent its lower end and it includes a steering shaft 2 which is connected for angular movement by means of an elastic joint 3 to a steering gear 5 which is affixed to a longitudinal support 4.

In accordance with the invention, the upper portion of the steering column 1 is braced and held against pivotal movement by a substantially horizontally disposed strut 6 of a sheet metal material which is subdivided by predetermined break points or weakened areas defined along the longitudinal edges to subdivide it into sections 7, 7a and 7b. The bracing strut 6 is secured to the ignition lock casing 8 of the steering system at its one end and to the front wall 9 of the vehicle at its opposite end.

Section 7b of the strut 6 carries a block 10 having a cross plate 11 which provides means for the attachment of the instrument panel 14. For this purpose, screw members 12 extend through longitudinal open-ended slots 13 of the plate 11 and into the instrument panel 14. The instrument panel 14 is cut away in the area of the plate 11 to accommodate the bracing strut 6.

In accordance with a further feature of the invention means are provided for aiding in the collapse of the bracing strut 6 and for insuring that the collapsed sections remain in a collapsed condition after the initial collapse takes place. For this purpose, a cable 15 is connected at its one end to the cross plate 11 and is guided over the upper end of a lever member 16 carried on the sections 7a of the strut 6. The cable 15 extends through a tubular guide 17 on the strut 6 of the section 7. The cable is then deflected around the hub 18 of the steering gear 5 and is tensionably fastened on a displaceable bolt 19. The end is connected to a hook member 22 which may be displaced in the head 20 by means of an adjusting screw bolt 21 carried at the inner end of the displaceable bolt 19. The displaceable bolt 19 is slidably guided in a clamp 23 which is fixed on the vehicle such as by a connection to the longitudinal member 4. The front end of the sliding bolt 19 extends through the front wall 9 and ends at a spaced location behind the front bumper 24.

In the event that a collision occurs, the front bumper 24 will be deformed inwardly, and this will be transmitted to the slide bolt 19 and the cable 15 to cause buckling of the strut 6 and to initiate the forward movement of the steering column 1. The steering column 1 is prevented from springing back from the front-most position indicated in dotted lines in FIG. 1 to the solid line position by holding means which includes a straight rod 27 having barbs or detents 26 which define a ratchet generally designated 28 which engages with the edge of a plate 30 which is carried on the front edge of the lever 16. The ratchet 28 engages, as indicated in dotted lines, with the plate 30 to hold the bracing strut 6 in the buckled dotted line position.

Figure 3:
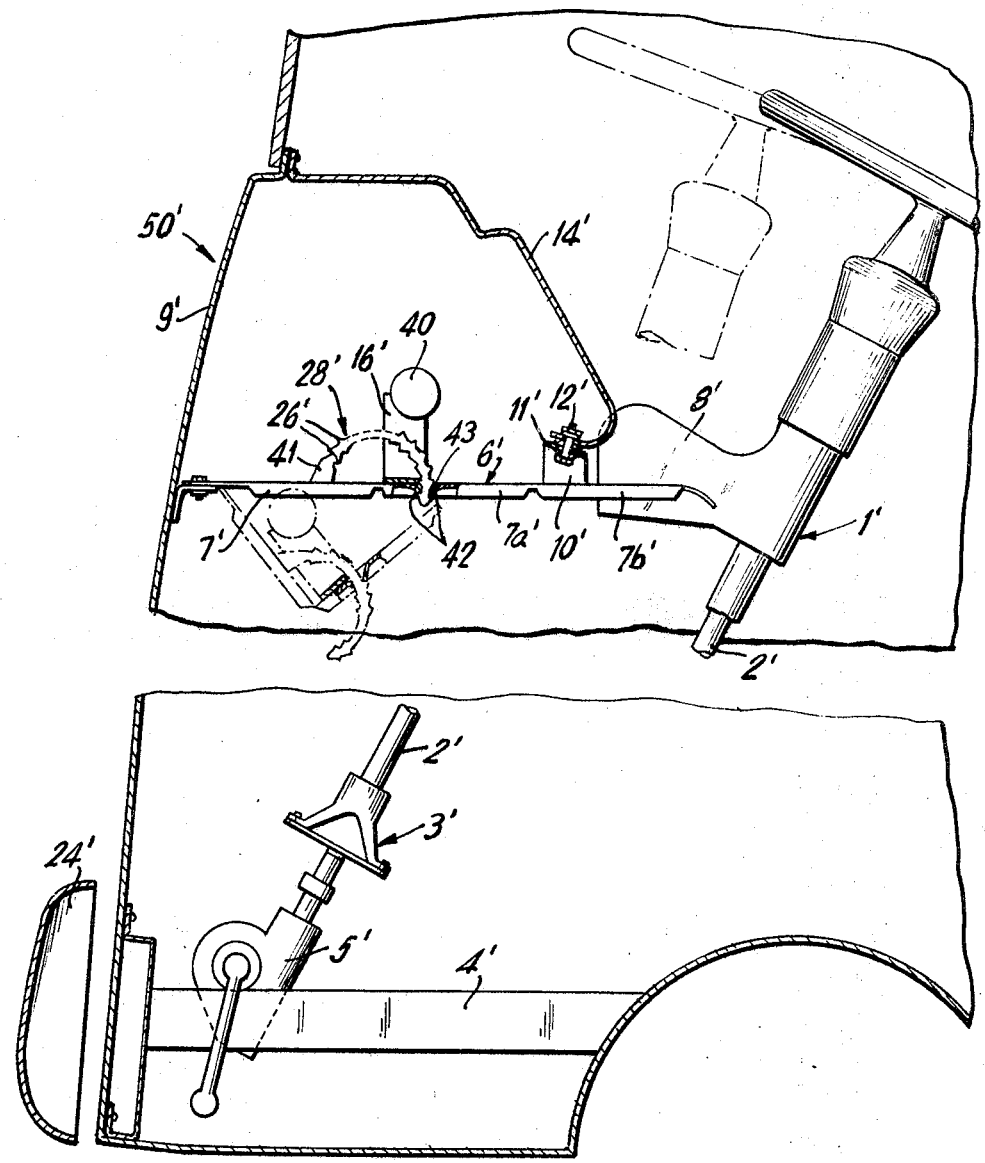
FIG. 3 is a view similar to FIG. 1 of another embodiment of the invention.

In the embodiment indicated in FIG. 3 there is provided a vehicle generally designated 50' having parts which are similar to that of the embodiment of FIGS. 1 and 2 but which are correspondingly designated with a prime added. A major difference resides, however, in the manner of initiating the displacement of the steering column 1'. For this purpose there is simply provided on the lever 16' a weight piece or weighted member 40 which, because of its inertia, becomes operative in collision accidents to exert a torque or breaking effect on the bracing strut 6' to indicate its buckling. The steering column 1' is thereby released for forward movement under its own forces of inertia.

In the embodiments of FIG. 3, the means for holding the bracing strut 6' in a buckled orientation includes an arcuate-shaped part 41 which is carried on the section 7' and defines a ratchet 28'. The ratchet barbs or detents 26' engage within a pawl formation defined by an opening 43 which has corresponding interengageable marginal lip formations 42 and which is located on the section 7a of the bracing strut 6'.

While a specific embodiment of the invention has been shown and described in detail to illustrate the application of the inventive principles, it will be understood that the invention may be embodied otherwise without departing from such principles.

What is claimed is:

1. A vehicle steering column construction particularly for front-steering vehicles, comprising a steering column adapted to be mounted adjacent its lower end in a manner permitting the forward pivotal movement thereof, a bracing strut extending generally horizontally in the travel direction of the vehicle and adapted to be secured to a wall of the vehicle and being secured to said steering column intermediate the height thereof, and means associated with said bracing strut for facilitating its buckling during an impact stress due to a collision of the vehicle to permit forward movement of said steering column.

2. A vehicle steering column construction according to claim 1, wherein said means associated with said bracing strut comprises break lines separating said bracing strut into a plurality of sections which are bendable about said break lines to facilitate buckling of said strut.

3. A vehicle steering column construction according to claim 1, including means carried by said bracing strut for holding said strut in a buckled position after it has buckled.

4. A vehicle steering column construction according to claim 3, wherein said means associated with said bracing strut for facilitating its buckling includes a plurality of break lines defined across said strut perpendicular to the travel direction and dividing said strut into a plurality of sections which will buckle by bending along the break lines, said means for holding said strut in a buckled condition including a ratchet member carried by one of said strut sections and a pawl engageable with said ratchet member carried by another of said strut sections, said sections being movable in a manner to cause said ratchet and pawl to permit buckling movement of said sections and holding of said sections after buckling is completed.

5. A vehicle steering column construction according to claim 1, wherein said means associated with said bracing strut for facilitating its buckling includes weakened areas defined along the length of said strut to facilitate its buckling by bending along said weakened areas, and means connected to at least one of said sections and being movable upon collision impact of the vehicle to initiate the buckling of said bracing strut.

6. A vehicle steering column construction according to claim 5, wherein said means connected to said bracing strut and being movable upon impact includes a sliding bolt member mounted in a position to extend forwardly of the vehicle and being movable backwardly upon contact of an object with the vehicle during collision, a lever member secured to one of said sections of said bracing strut, and a cable secured to another of said sections and extending over said lever member and engaged with said movable member whereby movement of said movable member moves said cable to initiate buckling of said sections.

7. A vehicle steering column construction according to claim 5, wherein said means connected to said strut to initiate buckling movement thereof comprises a lever member carried on one of said strut sections and a weight member carried on said lever member in a position to move forward upon impact of the vehicle and initiate buckling of said sections.

8. A vehicle steering column construction according to claim 5, including a vehicle having a front wall and a bumper adjacent said front wall, said movable means comprising a member extending through said front wall to a location slightly behind said bumper and being movable inwardly upon collapse of said bumper due to impact to cause buckling of said bracing strut.

9. A vehicle steering column construction according to claim 1, wherein means associated with said bracing strut for facilitating its buckling includes weakened areas defined across said bracing strut and dividing said bracing strut into a plurality of sections including a rear section connected to said steering column, a front section connected to the front wall of said vehicle and an intermediate section, a lever on said intermediate section, a cable connected to said rear section, a member movable in a direction away from the direction of travel upon impact of the vehicle with an object connected to said cable and causing the displacement of said cable to cause a buckling movement of said rear section and complete buckling of said strut.

10. A vehicle steering column construction according to claim 9, including a ratchet pivotally mounted on one of said bracing strut sections and having ratchet teeth engaged with said ratchet on another of said sections.

11. A vehicle steering column construction according to claim 9, including a curved ratchet member carried by said forward section having its end engaged in a pawl-shaped opening defined in said intermediate section, said sections upon buckling together causing the advance of engagement of said ratchet member in said pawl.

12. A bracing construction for supporting a steering column of a motor vehicle, comprising a horizontally disposed bracing strut, means for anchoring said strut adjacent its one end to a wall of a vehicle, means for mounting the opposite end of said strut to a steering column, and means associated with said strut for facilitating its buckling in a direction of its longitudinal axis.

13. A bracing construction for supporting a steering column of a motor vehicle, comprising a bracing strut, means for anchoring said strut adjacent its one end to a wall of a vehicle, means for mounting the opposite end of said strut to a steering column, means associated with said strut for facilitating its buckling in a direction of its longitudinal axis, means for facilitating the buckling of said strut comprises a cable connected to one of said strut members and means connected to the opposite end of said cable to move said cable to cause buckling of said strut sections upon movement of said member such as would occur during an impact by collision.

14. A bracing construction according to claim 13, wherein said means for facilitating the buckling of said strut comprises weakened areas defined across said strut and dividing said strut into a plurality of sections which are bendable about said weakened areas.

15. A bracing construction for supporting a steering column of a motor vehicle, comprising a bracing strut, means for anchoring said strut adjacent its one end to a wall of a vehicle, means for mounting the opposite end of said strut to a steering column, means associated with said strut for facilitating its buckling in a direction of its longitudinal axis, ratchet and pawl means connected between at least two of said sections and permitting buckling movement of said sections but holding said sections in a buckled condition.

16. A bracing construction for supporting a steering column of a motor vehicle, comprising a bracing strut, means for anchoring said strut adjacent its one end to a wall of a vehicle, means for mounting the opposite end of said strut to a steering column, and means associated with said strut for facilitating its buckling in a direction of its longitudinal axis, said means associated with said bracing strut for facilitating its buckling includes a weight carried on one of said sections and providing an inertia force for facilitating the forward buckling movement of said sections relative to each other.

References Cited

UNITED STATES PATENTS

| | | | |
|---|---|---|---|
| 1,619,980 | 3/1927 | Kelsey. | |
| 1,623,493 | 4/1927 | Postlethwait. | |
| 2,770,981 | 11/1956 | Fieber | 74—493 |
| 2,855,216 | 10/1958 | Sacks | 280—150 |
| 2,873,979 | 2/1959 | Venditty et al. | 280—87 |
| 3,203,709 | 8/1965 | Presunka et al. | 280—150 |
| 3,368,422 | 2/1968 | Walter | 180—90 X |
| 3,373,629 | 3/1968 | Wight et al. | 180—78 X |
| 3,380,548 | 4/1968 | Bauer | 180—90 |

KENNETH H. BETTS, Primary Examiner

U.S. Cl. X.R.

74—493; 188—1; 280—87